United States Patent [19]

Boss

[11] 4,210,022
[45] Jul. 1, 1980

[54] METHOD FOR THE INDUCTIVE MEASUREMENT OF FLUID FLOW

[75] Inventor: Jürg A. Boss, Arlesheim, Switzerland

[73] Assignee: Flowtec AG, Reinach, Switzerland

[21] Appl. No.: 944,030

[22] Filed: Sep. 20, 1978

[30] Foreign Application Priority Data

Oct. 5, 1977 [DE] Fed. Rep. of Germany ....... 2744845

[51] Int. Cl.² ............................................... G01F 1/58
[52] U.S. Cl. .................................................. 73/861.17
[58] Field of Search ....................... 73/194 EM, 194 E

[56] References Cited

U.S. PATENT DOCUMENTS

| | | | |
|---|---|---|---|
| 3,316,762 | 5/1967 | Westersten | 73/194 EM |
| 3,550,446 | 12/1970 | Tucker et al. | 73/194 EM |
| 4,010,644 | 3/1977 | Bonfig et al. | 73/194 EM |
| 4,144,751 | 3/1979 | Yokoyama | 73/194 EM |

FOREIGN PATENT DOCUMENTS 2052175  11/1972  Fed. Rep. of Germany .

Primary Examiner—Jerry W. Myracle
Attorney, Agent, or Firm—Gerald J. Ferguson, Jr.; Joseph J. Baker

[57] ABSTRACT

Method and apparatus for inductive flow measurement using a periodically reversed magnetic field, in which the useful signal is obtained by sampling and storing the signal voltage at equal but opposite values of induction of magnetic field and forming the difference of the stored sample values. There is formed between each two successive magnetic field impulses of opposite polarity an interval where the magnetic field is zero, there being generated in a compensation time interval within each magnetic field interval at the same time-interval before the next subsequent sampling of the signal voltage, a compensation voltage which restores the signal voltage during the compensation time interval to zero value. The compensation voltage value developed during the compensation time interval is stored and is employed until the next compensation time interval.

1 Claim, 5 Drawing Figures

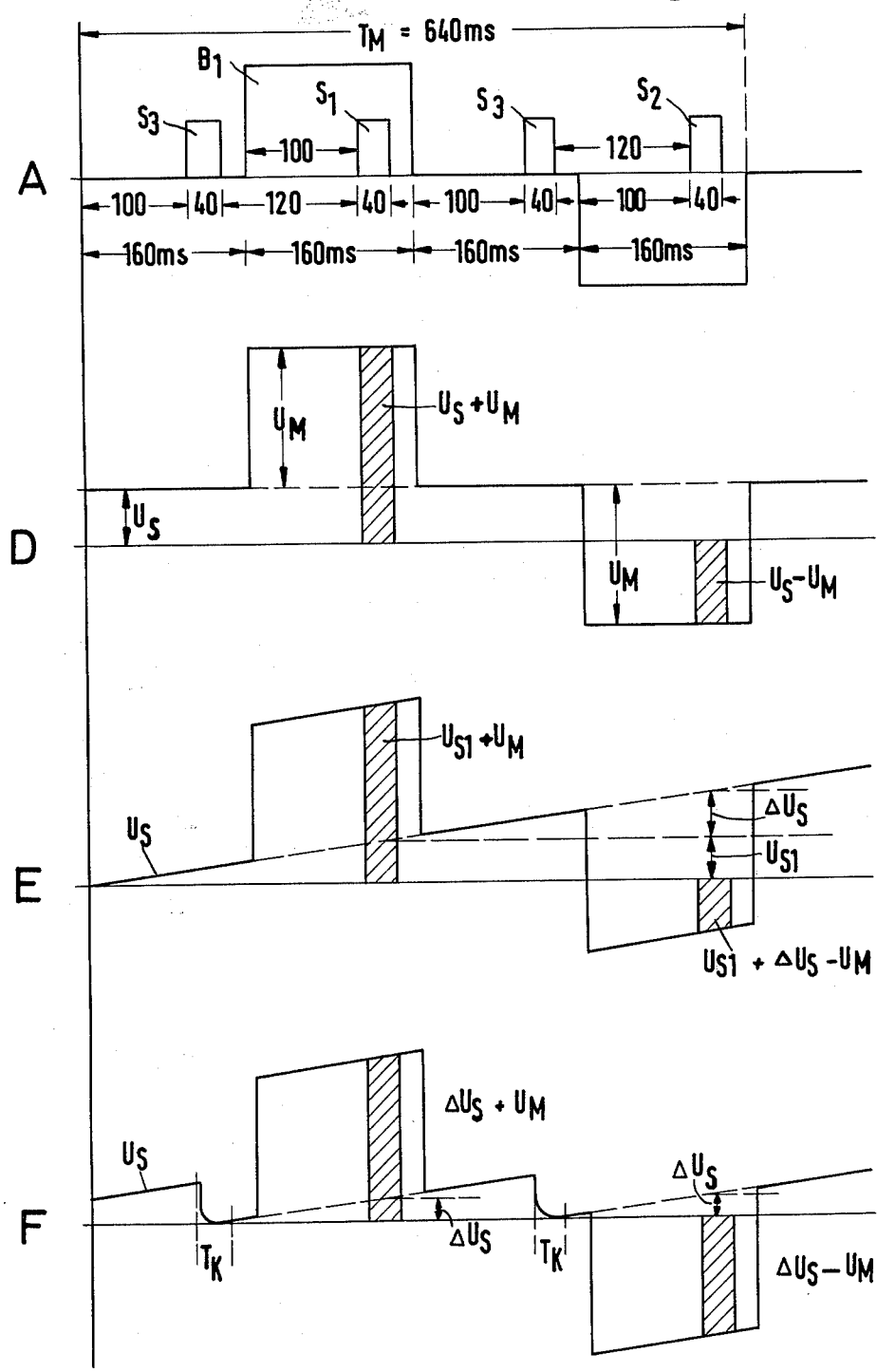

METHOD FOR THE INDUCTIVE MEASUREMENT OF FLUID FLOW

This invention relates to a method for inductive measurement of fluid flow using a periodically reversed magnetic field, in which the work signal is derived by sampling and holding the signal voltage at equal but oppositely poled values of induction of magnetic field and the difference between the stored sample values is formed. The invention also relates to an arrangement for carrying out this method.

In magnetic induction fluid flow measurements there exists the problem that the measured voltage denotive of the fluid flow has superimposed upon it a disturbing direct voltage (asymmetric voltage), which has its origin in different electro-chemical equilibrium potentials. The disturbing voltage may attain values which are substantially greater than the measured voltage.

In addition there may also be superimposed upon the measured voltage alternating current components which originate from the mains and have frequencies which correspond to the mains frequency or its harmonics.

In the known methods of the kind initially described the magnetic field is periodically changed between two equal values of induction of opposite signs. Use is made of the fact that the measured voltage changes its polarity with the magnetic field, while the asymmetrical voltage retains its polarity. There is thus attained by sampling at the one induction value the sum of the measured and assymetrical voltage and by sampling at the other induction value the difference of the asymmetrical voltage minus the measured voltage. From the difference between the two stored sampling values there is thus obtained a measurement signal free from asymmetrical voltages. This method however makes the assumption that the assymetrical voltage does not alter within the measurement cycle, since otherwise the alteration appears as an error in measurement. In addition the asymmetrical voltage must not assume too large a value, since otherwise the linear range of the measurement amplifier may be exceeded. Also for large values of the asymmetrical voltage great demands are made on the accuracy of the difference-forming circuits, since any error directly affects the measured value obtained as the difference.

It is also known, instead of a magnetic field reversed between two opposite values of induction to employ a unidirectional field periodically turned on and off. In this case with the magnetic field switched off the asymmetrical voltage is sampled and stored and with the magnetic field turned on the sum of the measurement and asymmetrical voltages is likewise sampled and stored.

The objection of the invention is to provide a method with which the electro-chemical disturbing voltages in the inductive measurement of fluid flow are automatically compensated in a simple manner and at little cost, if they alter within the measurement cycle, in which no electro-chemical voltages are formed with the fluid stationary and in which over-driving of the amplifier by two-large an asymmetrical voltage is prevented.

Starting from the method of a kind initially set out, this object is attained in accordance with the invention by forming, between each two successive magnetic field impulses of opposite polarity an interval in which the magnetic field is zero, generating in a compensating time interval in each magnetic field interval at the same time interval preceding the next sampling of the signal voltage, a compensation voltage which reduces to zero the signal voltage in the compensating time interval, the compensating value voltage generated in the compensating time interval being stored and employed up to the next compensation time interval.

The method according to the invention depends on the fact that a time variant asymmetrical voltage, if a linear alteration is assumed, starting from the value zero at the end of the compensation time interval always assumes the same value by the time the next sampling interval is reached. The signal voltages sampled in cyclic succession for the opposed values of induction thus always contain the same component of asymmetrical voltage, which is eliminated when the difference between the two signals is formed.

Since in addition the asymmetrical voltage does not attain excessive values between two compensation time intervals, which are separated by a time interval which corresponds to half of the measuring cycle, no over-driving of the amplifier through the asymmetrical voltage can occur. Since in the method according to the invention periodic reversal of the magnetic field is employed, the advantage is retained that with stationary fluids no electro-chemical voltages are formed, as is the case when a wholly unidirectional field is employed or when a unidirectional field is switched on and off. Since in addition the component of the asymmetrical voltage in each sampled value is small as compared with the measurement voltage component, the forming of the difference between successive signals requires only limited accuracy.

A further substantial advantage of the method according to the invention consists in that for the same sensitivity, a lower power consumption is required in comparison to the known method with reversed unidirectional feel or a unidirectional field which is switched on and off, because of the intervals in which the magnetic field is zero.

An arrangement for carrying out the method according to the invention for inductive flow measurement of an electrically conductive fluid flowing in a pipe, contains in known manner a magnetic field generator, which generates a periodically reversed magnetic field passing through the pipe perpendicular to the direction of flow, two electrodes arranged within the pipe, which are connected with the inputs of a measuring amplifier, sample and hold circuits to which the output of the measuring amplifier is connected and which are controlled by a control arrangement so that they sample the voltage of the measuring amplifier at mutually equal but oppositely poled values of magnetic induction and which store the sample values until the next sampling, and a circuit for forming the difference of the stored induction values; in accordance with the invention it is arranged that the magnetic field generator is so controlled that between any two successive magnetic field impulses of opposite polarity there exists an interval in which the induction is zero, and that a compensation input of the measuring amplifier is connected with the output of a storing control circuit which is connected with the output of the measuring amplifier during each compensation time interval, forms a compensating voltage value which controls the output voltage of the measuring amplifier to the value zero and which maintains this compensation voltage value at the compensation input of the measuring amplifier until the next compensation time interval.

An advantageous extension of the arrangement according to the invention consists in that the control circuit forms the compensation voltage value by integration of the output voltage of the measuring amplifier existing in the compensation time interval, and that the duration of the compensation time interval is equal to one period of the mains frequency for a multiple thereof. This extension allows the disturbing alternating components of the mains frequency or one of its harmonics, as well as in case of need also alternating components of which the frequency is a fraction of the mains frequency, to be automatically eliminated. Preferred features and advantages of the invention will be apparent from the following description of embodiment thereof, given with reference to the accompanying drawings in which:

Figure 1:
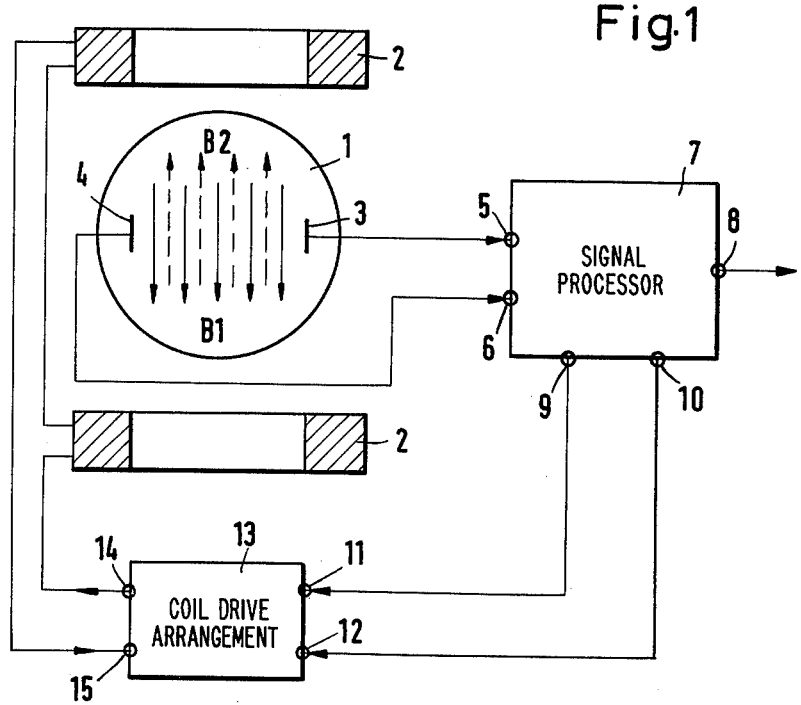
FIG. 1 shows a schematic general view of an arrangement for inductive fluid flow measurement in accordance with the invention.
Figure 2:
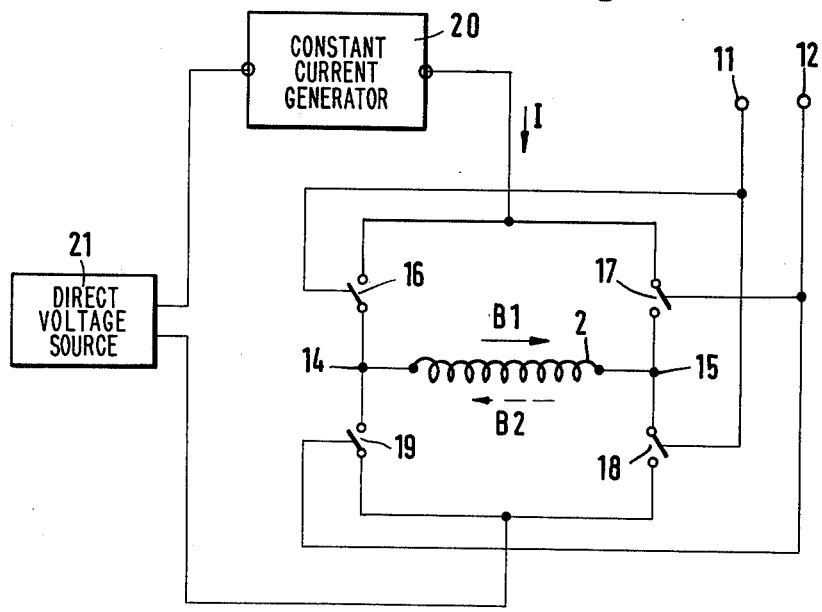
FIG. 2 shows a simplified block diagram of the controlled arrangements for the magnetic field coil of the arrangement of FIG. 1.
Figure 3:
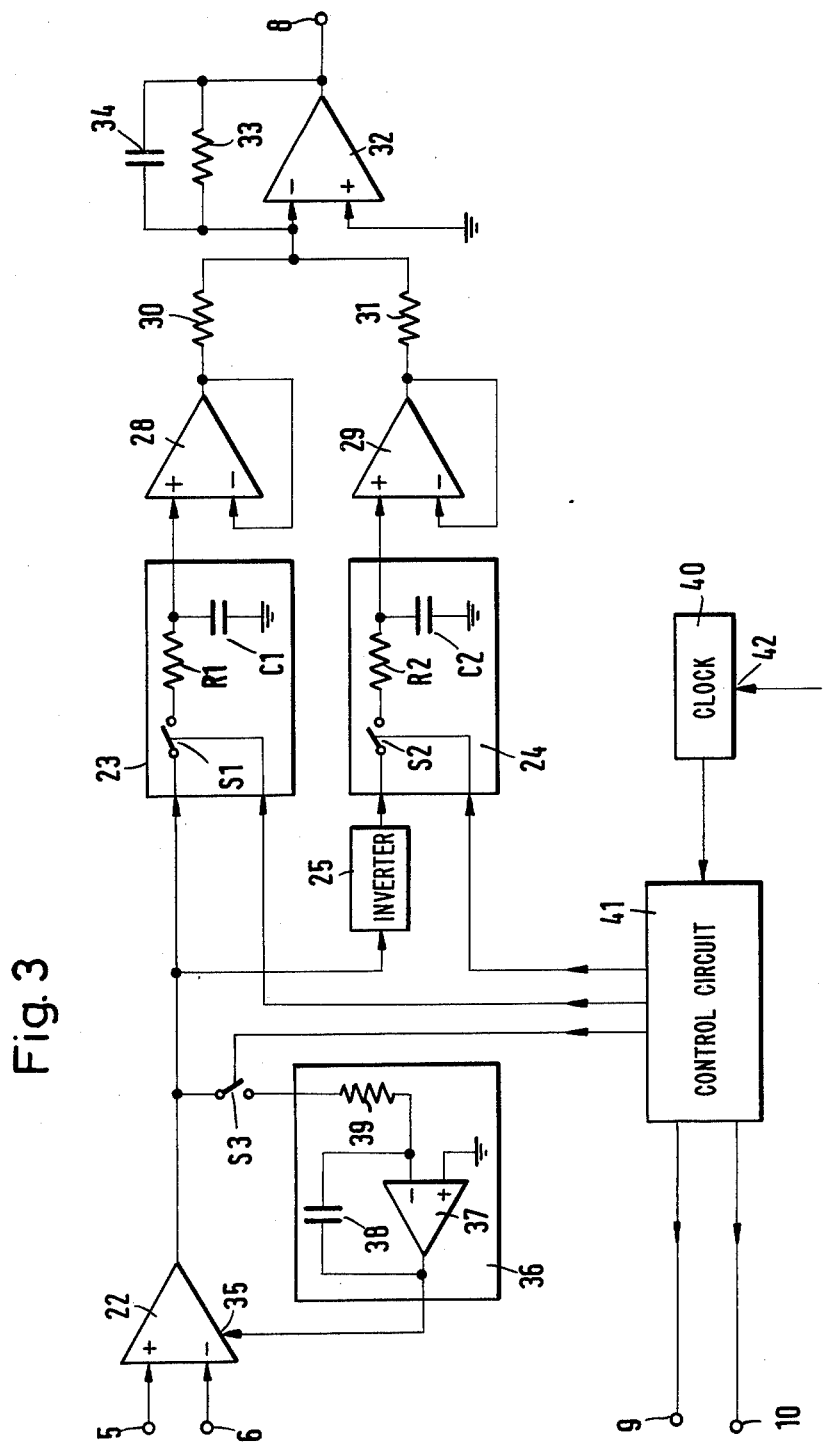
FIG. 3 shows the block diagram of the signal processing arrangement of the arrangement of FIG. 1.
Figure 4:
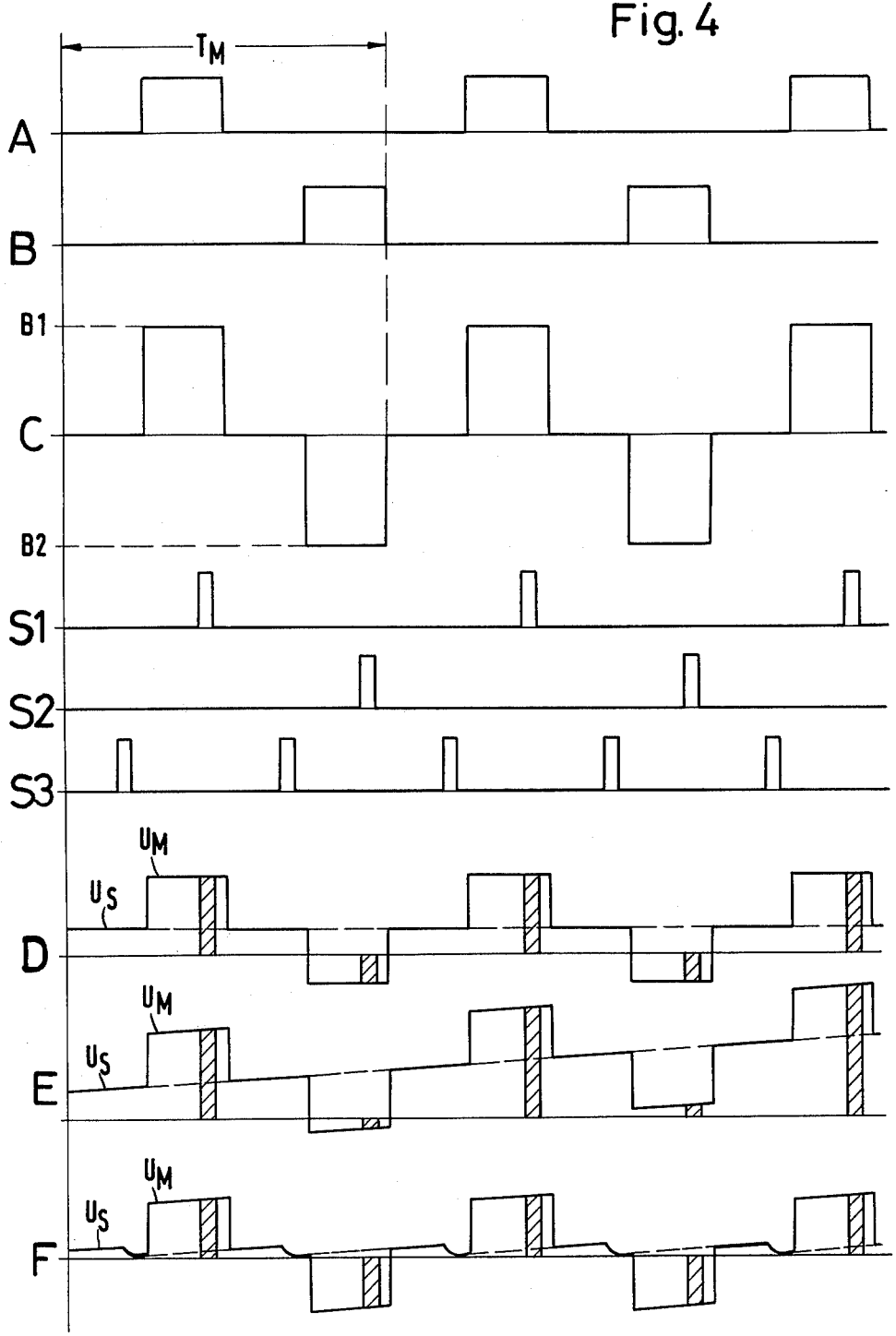

FIG. 4 comprises waveform diagrams used to explain the mode of operation of the arrangement for FIGS. 1 to 3; and FIG. 5 shows diagrams to a larger time-scale for explaining the mode of operation of the arrangement according to the invention.

FIG. 1 shows schematically a pipe 1, through which an electrically conductive fluid flows perpendicular to the plane of the drawing. A magnetic field coil 2, which for reasons of symmetry consist of two equal halves arranged on either side of the pipe 1, generate within the pipe a magnetic field B1, B2 passing perpendicularly to the axis of the pipe. Within the pipe 1 there are arranged two electrodes 3 and 4, at which an induced voltage can be tapped off, which is proportional to the mean velocity of flow of the electrically conductive fluid through the magnetic field. The electrodes 3 and 4 are connected with the two inputs 5 and 6 respectively of a signal processing arrangement 7, which provides at its output 8 a signal appropriate for further processing, which is a measure of the velocity of flow. The signal processing and control arrangement provides at two further outputs 9 and 10 control signals which are applied to the two inputs 11 and 12 of a coil drive arrangement 13. The two coil halves 2 are connected in series to the outputs 14 and 15 of the coil drive arrangement 13.

One embodiment of the coil drive arrangement 13 is shown schematically in FIG. 2. It contains four switches 16, 17, 18, 19 which are connected after the manner of a bridge circuit, the magnetic coil 2 lying in a bridge diagonal, while the other bridge diagonal is connected in series with a constant current generator 20 to a direct voltage source 21. The direct voltage source 21, which may for example provide a voltage of 24 volts, can either be a mains-fed unit or a battery.

The switches 16 to 19, which in practice are naturally electronic switches, are actuated in diagonally opposed pairs by signals applied to the input terminals 11 and 12.

If an impulse is applied to input 11, the two switches 16 and 18 are closed, which lie in diametrically opposed branches of the bridge; in this case the current I delivered by the constant current generator 20 flows in the direction of the arrow B1 through the magnetic coil 2, so that this generates within the tube 1 a magnetic field B1, of which the direction is indicated in FIG. 1 by the arrows shown in full line. If an impulse is applied to input 12, the two switches 17 and 19 are closed so that the current I applied to the bridge circuit flows in the opposite direction through the magnetic coils 2, as is indicated by the broken-line arrow B2; as a result the magnetic field B2 generated in the pipe 1 has the direction indicated by the broken-line arrow. The inductions B1 and B2 have the same value, but are of opposite signs. When an impulse is applied to neither of the inputs 11 and 12, all the switches are opened and the magnetic field in the pipe 1 has zero induction value.

FIG. 3 shows a more detailed circuit diagram of the signal processing and control arrangement 7 of FIG. 1. The two input terminals 5 and 6 are the inputs of a measuring amplifier 22 constructed as a difference amplifier, to which the signal voltage arising between the electrodes 3 and 4 is thus applied. To the output of the measuring amplifier 22 there are connected two sample and hold circuits 23 and 24, the sample and hold circuit 23 being connected directly and the sample and hold circuit 24 by way of an inverter 25, which inverts the polarity of the output signal of the measuring amplifier 22. For simplicity it is indicated that the sample and hold circuit 23 contains a switch S1, which is closed by a signal applied to a control input 26 and then connects a storage capacitor C1 by way of a resistance R1 with the output of the measuring amplifier 22, so that the storage capacitor C1 charges to a voltage which depends upon the output voltage of the measuring amplifier 22. The circuit elements R1, C1 together form an integrating circuit, that integrates the output voltage of the measuring amplifier 22 during the time of closure of the switch S1. The output of the sample and hold circuit 23 is connected with the input of a buffer amplifier 28, which prevents the capacitor C1 from being discharged after the opening of the switch S1; the sampled value stored on the capacitor C1 thus remains available at the output of the buffer amplifier 28 until the next closure of the switch S1.

In the same manner the sample and hold circuit 24 contains a switch S2, which is closed by a control signal applied to a control input 27, as well as a storage capacitor C2, which together with a resistance R2 forms an integrating circuit, that integrates the output voltage of the inverter 25 during the time of closure of the switch S2. The charging voltage on the capacitor C2 attained after the opening of the switch S2 remains available at the output of a buffer amplifier 29 connected to the output of the sample and hold circuit 24 until the next closure of the switch S2.

The outputs of the two buffer amplifiers 28 and 29 are connected by way of summing resistances 30 and 31 respectively with the inverting input of an operational amplifier operating as a summing amplifier, in the negative feedback circuit of which there is connected a resistor 33 in parallel with a capacitor 34. The output of the operational amplifier 32 corresponds to the output 8 of the signal processing and control arrangement 7.

The measuring amplifier 22 includes an additional compensation input 35, which is connected to the output of a storing control circuit 36. As an example it is indicated that the storing control circuit may contain an operational amplifier 37, which by means of a capacitor 38 in the negative feedback circuit in conjunction with an input resistor 39 is connected as an integrator. The non-inverting input of the operational amplifier 37, acting as a reference input, is connected to earth. The input resistance 39 is connected in series with a switch S3 to the output of the measuring amplifier 22. It may thus be seen that if the switch S3 is closed the operational amplifier 37 develops an output voltage which is applied to the compensating input 35 of the measuring amplifier 22 and has a value such that the output voltage of the measuring amplifier 22 is controlled to the value zero. When the switch S3 is open the operational amplifier 37 retains the compensation voltage value developed until the next closure of the switch S3.

A control circuit 41 controlled by a clock 40 provides at three outputs the control signals for the switches S1, S2, S3; two further outputs of the control circuit 41 correspond to the output 9 and 10 of FIG. 1, at which there are provided the control circuits for the coil drive arrangements 13.

If the described arrangement is fed from the mains, the clock 40 may have a synchronizing input 42, through which it may be synchronized by the main supply. This synchronizing arrangement may be omitted in a battery-driven apparatus.

The mode of operation of the above described circuit will be explained with reference to FIGS. 4 and 5.

Diagram A of FIG. 4 shows the controlled impulses at the output 9 and diagram B shows the control impulses at the output 10 of the signal processor 7 of FIG. 1. Because of the above-described mode of operation of the coil drive arrangement 13 (FIG. 2) the magnetic field in pipe 1 thus assumes alternately the induction values B1, and B2 represented in diagram C of the FIG. 4, between which there exists an interval in which the magnetic field has the induction value zero. The period, which is equal to the duration $T_M$ of a measuring cycle, is large compared with the period of the mains frequency; the signals may be obtained for example from the mains frequency by digital frequency division by the dividing factor 32, so that for a mains frequency of 50 Hz the measuring cycle has duration $T_M$ of 640 ms; this corresponds to a frequency of field generation of 1.5625 Hz. In the illustrated example it is assumed that in each period the two magnetic field impulses as well as the intervals lying therebetween all have the same duration, which in the above-given numerical example thus amounts to 160 ms.

The diagrams S1, S2 and S3 illustrate the control impulses which are provided by the control circuit 41 for actuation of the switches S1, S2 and S3 respectively of FIG. 3. The control impulses are substantially shorter than the control impulses of diagrams A and B generated for controlling the magnetic field and in consequence also substantially shorter than the magnetic field impulses generated by the magnet coil 2. Preferably, the duration of the sample control impulses S1, S2 and the compensation control impulse S3 are similar in relation to the period of the mains voltage; in a preferred embodiment they amount for example to 40 ms, that is to twice the mains period. For clarity there are shown in diagram A of FIG. 5, to a larger time-scale, the mutual timings of the magnetic field impulses B1, B2 and control impulses S1, S2, S3 form one period. The sampling control impulses S1 fall within the positive magnetic field impulse B1 and the sampling control impulses S2 fall within the negative magnetic field impulses B2. They preferably lie in the region of the trailing end of these impulses, so that relations have become stationary in the sampling time interval and possible initial oscillatory processes have subsided. In the above-given numerical example each sampling control impulse S1, S2 may commence at a time interval of 100 ms after the beginning of the corresponding magnetic field impulse B1 or B2, so that it ends 20 ms before the end of the magnetic field impulse.

The compensation control impulses S3 fall within the intervals between each two successive magnetic field impulses. They begin for example likewise at a time interval of 100 ms after the end of the preceding magnetic field impulse, so that after the end of each compensation control impulse S3 there remains time interval of 20 ms before the beginning of the succeeding magnetic field impulse. Between the end of each compensation control impulse S3 and the beginning of the next sampling control impulse S1, S2 there thus exists always the same time interval of 120 ms.

Diagram B of FIG. 4 shows the wave form of the signal voltage obtained by the super position of disturbing direct voltage $U_S$ and measurement voltage $U_M$ for the case of a disturbing direct voltage $U_S$ constant with time, which is assumed to be smaller than the measurement voltage $U_M$. In this diagram the sampling effected by the sampling pulses S1, S2 is also indicated, it being assumed that the compensation circuit with the storage control circuit 36 is not present. Diagram E of FIG. 4 shows under the same assumptions the relations for the case of a disturbing direct voltage $U_S$ varying with time. Finally FIG. 4 represents the mode of operation of the compensation circuit for the case corresponding to diagram E. For the sake of clarity the diagrams D, E and F for one cycle of measurement are shown to a larger scale in FIG. 5.

In the case of diagram D, there exists during the intervals in the magnetic field a constant disturbing direct voltage $U_S$, upon which a positive-going measurement voltage $U_M$ is superimposed during the positive magnetic field pulses B1, and a negative-going measurement voltage $U_M$ during the magnetic field pulses B2. Since the sampling always relates to zero level, the value sampled during the sampling pulses S1 is $U_S+U_M$ and the value sampled during the sampling pulses S2 is $U_S-U_M$. As a result of the inversion by the inverter 25 and the subsequent summing operation, the difference of the two sampled values is formed:

$$U_S+U_M-(U_S-U_M)=2U_M.$$

The disturbing direct voltage $U_S$ is thus eliminated by this difference formation.

If, on the other hand, the disturbing direct voltage $U_S$ alters with time, as is illustrated in diagram E, complete compensation of the disturbing direct voltage by differencing is no longer possible. During sampling by the sampling pulses S1 a disturbing direct voltage $U_{S1}$ is present, so that the sampled value $U_{S1}+U_M$ is stored. During sampling by the sampling pulses S2 the disturbing direct voltage has increased by the amount S2 the disturbing direct voltage has increased by the amount $\Delta U_S$; the sampled values $U_S+\Delta U_S-U_M$ is thus stored. The ensuiing formation of the difference thus yields:

$$U_{S1}+U_M-(U_{S1}+\Delta U_S-U_M)=2U_M-\Delta U_S.$$

The measurement is also affected by an error, which is equal to the alteration. $\Delta U_S$ of the disturbing direct voltage between the two successive samplings. Diagram E of FIG. 4 also allows a further disadvantageous consequence of the varying disturbing voltage to be recognised: the sum of the disturbing direct voltage and the measurement voltage can rapidly assume very large values, which exceed the linear modulation range of the measuring amplifier. When this occurs measurement is no longer possible. If in addition the disturbing direct is large compared with the measurement voltage, errors in the formation of the difference very greatly affect the accuracy of the measurement results obtained.

Diagram F of FIGS. 4 and 5 show how the phenomena described above may be avoided by the operation of the storing circuit 36 in combination with the particular kind of field drive employed. Each compensation control impulse S3 causes the output voltage of the measurement amplifier 22 to be regulated to zero during a compensation time interval $T_K$ which occurs shortly before the beginning of each magnetic field impulse. Since this regulation is effected during the intervals in the magnetic field, it operates only on the disturbing direct voltage existing at this point in time. After the end of the compensation time interval $T_K$ the disturbing direct voltage then alters in accordance with the conditions prevailing, starting from the value zero. At sampling by the sampling pulse S1 it has attained a certain value $\Delta U_S$. Thus in this sampling time interval the sample value $\Delta U_S + U_M$ is sampled and stored.

Before the subsequent negative magnetic field impulse B2 the output voltage of the measurement amplifier 22 is again controlled to zero during a compensation time interval $T_K$.

Thereafter it rises again, starting from this value zero. If a constant linear alteration of the disturbing direct voltage is assumed, it again attains the same value $\Delta U_S$ at the time of sampling by the sampling control impulse S2 so that in this sampling time interval the sample value $\Delta U_S - U_M$ is sampled and stored. The subsequent formation of the difference between the sampled values then gives:

$$U_S + U_M - (\Delta U_S - U_M) = 2U_M$$

it may thus be seen that the disturbing direct voltage is completely compensated, although it alters with time.

It is also to be seen that the disturbing direct voltage can always have only a small value, since it is returned to zero value during each half of the measuring cycle, from which it may be perceived that it does not alter greatly in this space of time. There is thus no danger of over-driving of the measurement amplifier.

Finally, the disturbing direct voltage $\Delta U_S$ to be eliminated at each formation of a signal difference always remains small in relation to the measurement voltage $U_M$ so that accuracy of the difference formation affects the accuracy of measurement only insignificantly.

Because the signals sampled by the control impulses S1, S2 and S3 are always integrated over the duration of a time interval of 40 ms, that is equal to two periods of the mains frequency, the superimposed disturbing frequencies, which are a multiple of half the mains frequency (25 Hz), are made ineffective, since there direct current mean value is zero for the sampled signal.

The choice of the very low working frequency, which is only a fraction of the mains frequency and in the example given is 1.5625 Hz for a mains frequency of 50 Hz, yields several advantages. On the one hand there is, between the turning of the coil current and the sampling of the signal voltage sufficient time for initial oscillations to decay and stationary conditions to result. On the other hand, at such low frequencies the coils may be regarded as practically pure resistances, so that no large amount of reactive power is necessary.

The coil currents and the magnetic fields generated by them have for simplicity been illustrated as rectangular impulses. The described method is however, independent of the waveform of the coil currents and magnetic fields. Even with rectangular drive pulses, because of the self-inductance of the coils, in general a more trapezoidal wave form of the coil currents will result.

What we claim is:

1. A method for inductive flow measurement by generating a magnetic field in a direction perpendicular to the flow and measuring the signal voltage induced by the flow across a pair of electrodes, comprising the steps of generating a periodically reversed magnetic field comprising field impulses of opposite polarity separated by magnetic field intervals in which the magnetic field has zero value, generating during a compensation time interval within each of said magnetic field intervals a compensating voltage of a magnitude and polarity adapted to compensate the disturbance voltage existing across said electrodes during said compensation time interval to zero value, storing said compensating voltage until the next compensation time interval and employing said stored compensating voltage for compensating the disturbance voltage contained in said signal voltage, sampling said signal voltage at a sampling time interval within each of said magnetic field impulses, each of said sampling time intervals having the same time distance from the preceding compensation time interval, and forming the difference of the signal voltage values sampled at successive sampling time intervals.

* * * * *